United States Patent [19]

Fernsler et al.

[11] 4,251,833
[45] Feb. 17, 1981

[54] TELEVISION HORIZONTAL AFPC WITH PHASE DETECTOR DRIVEN AT TWICE THE HORIZONTAL FREQUENCY

[75] Inventors: Ronald E. Fernsler; Donald H. Willis, both of Indianapolis, Ind.

[73] Assignee: RCA Corporation, New York, N.Y.

[21] Appl. No.: 37,517

[22] Filed: May 9, 1979

[51] Int. Cl.³ .............................................. H04N 5/04
[52] U.S. Cl. .................................... 358/148; 358/155; 358/158
[58] Field of Search ............... 358/148, 155, 158, 159; 360/37; 331/18, 19, 20; 328/165

[56] References Cited

U.S. PATENT DOCUMENTS

| | | | |
|---|---|---|---|
| 3,688,037 | 8/1972 | Ipri | 358/158 |
| 3,846,584 | 11/1974 | Itoh | 358/158 |
| 3,878,335 | 4/1975 | Balaban | 358/158 |
| 3,990,107 | 11/1976 | Hanma | 360/37 |
| 4,093,963 | 6/1978 | Uchida | 358/158 |
| 4,144,544 | 3/1979 | Fernsler | 358/158 |
| 4,144,545 | 3/1979 | Fernsler | 358/158 |

Primary Examiner—Robert L. Griffin
Assistant Examiner—Michael A. Masinick
Attorney, Agent, or Firm—Eugene M. Whitacre; William H. Meise; W. Brinton Yorks, Jr.

[57] ABSTRACT

A television phase-lock (AFPC) loop is used to maintain a horizontal oscillator in synchronism with horizontal synchronizing signals in the presence of noise. The AFPC loop includes a phase detector and a controlled oscillator. The synchronizing signals are applied to one input of the phase detector and the oscillator output is applied to the other phase-detector input. The phase-detector output is coupled back to the oscillator control input to maintain the oscillator output in frequency synchronism. During the vertical synchronizing and equalizing pulse intervals, the synchronizing signals applied to the AFPC phase detector increase in frequency. The increase in frequency may decrease the AFPC loop gain or unsynchronize the loop. This effect is overcome by providing a second output from the horizontal oscillator at a frequency higher than, but related to the frequency of the desired output, and using the higher frequency to drive the phase detector. A phase ambiguity results from the higher-frequency control. The phase ambiguity is resolved by a controlled switch which couples the high-frequency oscillator output to the phase detector during the vertical synchronizing and equalizing pulse intervals and couples the desired oscillator output signal to the phase detector input at other times.

8 Claims, 6 Drawing Figures

TELEVISION HORIZONTAL AFPC WITH PHASE DETECTOR DRIVEN AT TWICE THE HORIZONTAL FREQUENCY

BACKGROUND OF THE INVENTION

This invention relates to a television horizontal automatic frequency and phase control (AFPC) loop in which the phase detector compares horizontal synchronizing signals with oscillator signals at a frequency twice that of the horizontal deflection drive for maintaining AFPC gain during the vertical synchronizing and equalizing pulse intervals.

Television displays of broadcast television signals are generated by repetitively scanning an electron beam over the surface of a picture tube viewing screen to form a lighted raster area. The beam intensity is modulated by video signals to form images on the screen representative of the picture to be displayed. Conventional television provides a high-speed horizontal scanning in conjunction with a relatively low-speed vertical scanning. The scanning in the vertical and horizontal directions is synchronized with synchronizing signals included in a composite video signal with the video signal to be displayed. The synchronizing signals are extracted from the composite video, and the synchronizing signals thus extracted are used to synchronize the vertical and horizontal-direction scanning apparatus.

The synchronizing signals are extracted from the composite video by use of synchronizing signal separator circuits. A sync separator for separating the horizontal synchronizing signal from the composite video includes a differentiating circuit and a threshold circuit. The differentiating circuit selectively couples signals at and above the horizontal synchronizing frequency to the threshold circuit. The threshold circuit responds to the differentiated synchronizing-signal portions of the composite video to produce a sequence of constant-width pulses representing horizontal frequency, synchronizing portions of the composite video.

The vertical synchronizing signals contained in the composite video are high-amplitude pulses having low-frequency components. The vertical synchronizing signal proper has a duration of three horizontal lines. In order to maintain the flow of horizontal synchronizing information during the vertical synchronizing interval, the vertical synchronizing pulse includes serrations by which the horizontal oscillator may be synchronized. In the NTSC television system, vertical scanning of an image is accomplished during two successive field intervals, the horizontal scanning lines of which are interlaced. Interlacing requires that the vertical oscillator timing be maintained in an exact relationship with the horizontal frequency. In order to help the vertical sync detector to maintain exact timing in extracting the vertical synchronizing pulses, equalizing pulses are provided in the composite video during a period of three horizontal lines preceding and following the vertical synchronizing intervals. The equalizing pulses recur at twice the rate of the horizontal synchronizing pulses.

In television systems in which the composite video signals are modulated onto a carrier and broadcast, many of the television receivers are in areas far from the transmitting station, where a weak signal can be expected. Due to the presence of unavoidable thermal noise, and also due to various forms of interference signals which may occur in the vicinity of the receiver, it may be expected that the composite video as received and the synchronizing signals derived therefrom will be intermingled with electrical noise. This electrical noise is manifested as random variation of the desired signal amplitude, and can severely perturb the operation of the display device. Commonly, noisy synchronizing causes "rolling" or "tearing" of the image displayed on the raster. As transmitted, the synchronizing signal pulses recur at a rate which is carefully controlled and extremely stable. Since the presence of noise obscures the synchronizing signals in a random manner, it has become common practice to obtain synchronization of the horizontal deflection circuit with the horizontal synchronizing pulse signal by the use of an oscillator, the free-running frequency of which is near the horizontal scanning frequency, and the exact frequency and phase of which is controlled in an indirect manner by a phase-lock loop (PLL) to equal the synchronizing signal frequency and phase. Thus, when any one synchronizing pulse is obscured by noise, the rate of the oscillator remains substantially unchanged, and the deflection circuits continue to receive regular deflection control pulses.

In a PLL, a phase detector compares the output of the horizontal oscillator with the horizontal synchronizing pulses from the sync separator and produces a pulsating control signal representative of the frequency and phase difference between the two. The control signal is then filtered and applied to the oscillator in such a manner as to maintain the oscillator in frequency and phase synchronism with the average frequency and phase of the received synchronizing pulses.

Since the PLL is a feedback system, there is an undesirable residual phase error between the oscillator signal and the synchronizing signal. High loop gain is desirable in order to minimize error, but, the loop then becomes more responsive to perturbing noise. This can be offset by reducing the closed-loop bandwidth of the PLL, which may undesirably reduce transient response time. Thus, a compromise between loop gain and bandwidth is often necessary.

With the advent of integrated circuits for low-power signal processing in television devices, it has become convenient in a PLL to compare the horizontal synchronizing signals from the sync separator with a square wave as produced by the controlled horizontal oscillator rather than with a sawtooth signal. During the synchronizing pulse interval, the PLL phase detector gates a first current source which charges a storage capacitor in a first polarity and when the oscillator square wave output is high, and which turns off the first current source and turns on a second current source poled to discharge the capacitor when the oscillator output is low. Thus, when the transition time of the square-wave oscillator output is centered on the synchronizing pulse, the charging and discharging effects are equal and the net capacitor voltage does not change. This maintains the oscillator frequency constant.

With the described type of phase detector, the phase detector gain and therefore the loop gain of the PLL may decrease during the equalizing and vertical synchronizing pulse intervals. The phase detector gain drops because during the vertical sychronizing and equalizing pulse intervals the sync signal occurs twice during each VCO output square wave, and thus the phase detector compares during both the rise and fall times of the square wave. Changes in oscillator phase which change the phase detector output during one half of the square wave result in an equal and opposite change during the other half of the square wave and no net change in output results. Thus the oscillator may drift in an uncontrolled manner during the vertical synchronizing and equalizing pulse intervals.

Such a decrease in gain of the PLL may be disadvantageous when rapid slewing of the horizontal oscillator frequency or phase is required during the vertical blanking interval. This may be the case, for example, when the television receiver is to be used to display information which has been recorded on a home-type video tape recorder. Such tape recorders often have a plurality of reproduction heads, each of which is mechanically scanned across the tape. In one common scheme, two heads are used, which alternately scan the tape for a duration equal to that of a vertical field. In order to avoid loss of, or breaks in, the displayed information, scanning of the succeeding field is commenced by the second head substantially concurrently with the end of scanning in the first head. However, slight differences in tape tension or in the dimensions of the mechanical tape transport acting on the tape for playback compared with the tension and dimensions when the tape was recorded results in differences in the time between succeeding horizontal synchronizing pulses in the information as recorded as compared with playback, especially during the switchover between heads. This results in a discontinuity or step change in the phase of the horizontal synchronizing pulses available for synchronizing the horizontal oscillator, which step normally occurs about five horizontal lines before the end of a vertical scanning interval and the beginning of the vertical blanking interval. A high oscillator slew rate during the vertical blanking interval is necessary to conform the horizontal oscillator phase to the synchronizing signal phase after the step change, and this conformance must be complete before scanning begins for the next succeeding field in order to correctly reproduce the desired image. A decrease in PLL gain during the equalizing and vertical synchronizing pulse intervals as may be occasioned by the presence of equalizing pulses may prevent rapid slewing of the horizontal oscillator and therefore prevent accomodation of such a step change. This may result in an apparent bending or tearing of vertical lines in the displayed image at the top of the raster.

SUMMARY OF THE INVENTION

A television oscillator phase control arrangement includes a source of television synchronizing signals having first portions at the horizontal scanning frequency during recurrent first intervals and second portions at a higher frequency during recurrent second intervals. A controlled oscillator has a first output terminal at which first oscillator signals are generated at a first frequency and also includes a control terminal by which the oscillator rate may be varied. A phase detector has an input terminal coupled to the source of synchronizing signals and an output terminal coupled to the rate control terminal of the controlled oscillator. A second input terminal of the phase detector is coupled to the controlled oscillator to form an AFPC loop for control of the oscillator frequency and phase in response to the synchronizing signals. In accordance with the invention, the controlled oscillator produces a second output signal at a second frequency related to and greater than the frequency of the first output signal. The controlled oscillator is coupled to the phase detector for applying the second oscillator signals to the phase detector for frequency and phase control of the oscillator. A phase ambiguity results. A phase control arrangement is coupled to the phase detector and to the controllable oscillator for resolving the ambiguity.

DESCRIPTION OF THE INVENTION

Figure 1:
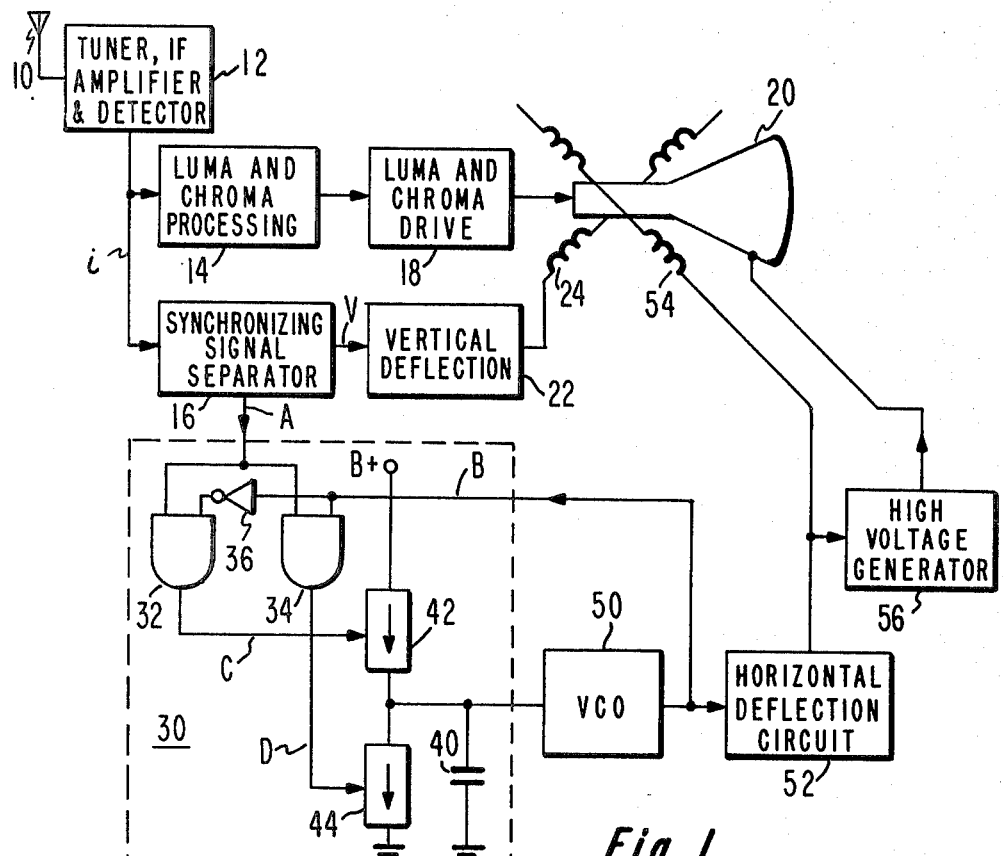
FIG. 1 illustrates in block and schematic diagram form a television receiver including an AFPC loop according to the prior art.

In FIG. 1, a television receiver includes an antenna 10 for receiving broadcast television signals. Antenna 10 is coupled to a tuner, intermediate-frequency (IF) amplifier and video detector illustrated together as a block 12, for producing composite video which is coupled by way of a conductor i to appropriate luminance and chrominance processing circuits illustrates as a block 14 and also to a synchronizing signal separator illustrated as a block 16. The luminance and chrominance information generated by processing circuits 14 is coupled to a kinescope 20 by means of appropriate luminance and chrominance drive circuits illustrated as a block 18.

Synchronizing signal separator 16 separates the vertical synchronizing signals from the composite video and couples them by way of a conductor V to a vertical deflection circuit illustrated as a block 22. Deflection circuit 22 produces recurrent sawtooth current drive signals which are applied in synchronism with the vertical synchronizing signals to vertical deflection windings 24 associated with kinescope 20.

Synchronizing signal separator 16 also separates the horizontal synchronizing signals from the composite video and applies them by way of a conductor A to a phase detector designated generally as 30. Phase detector 30 includes first and second AND gates 32 and 34, respectively, each having an input coupled to conductor A. A phase detector integrating or filter capacitor 40 has one end connected to ground and receives charging current from B+ through a gated current source 42. A second gated current source 44 is coupled in parallel with capacitor 40 for discharging the capacitor. Gated current source 42 is controlled by the output of AND gate 32 and gated current source 44 is controlled by the output of AND gate 34. The voltage across capacitor 40 is the output of phase comparator 30. This output voltage is coupled to a frequency-controllable horizontal oscillator (VCO) illustrated as a block 50. Oscillator 50 produces output signals which are coupled to the input of a horizontal deflection circuit 52. Deflection circuit 52 produces horizontal deflection current under the control of oscillator 50. The deflection current is coupled to horizontal deflection windings illustrated as 54 associated with kinescope 20. Horizontal deflection circuit 52 also drives a high voltage generator illustrated as 56 which produces a direct ultor voltage for energizing the kinescope.

The output of horizontal oscillator 50 is also applied by way of a conductor B to a second input of AND gate 34 and, by way of an inverter 36, to a second input of AND gate 32.

In operation, the tuner of FIG. 1 selects a broadcast carrier signal, mixes it to an IF frequency, amplifies and detects it to produce a composite video signal representative of the information in the selected broadcast signal. The color and luminance portions of the composite video are coupled to the control elements of the kinescope by processing circuits 14 and drive circuits 18 as mentioned and the vertical synchronizing signals separated by separator 16 control the vertical deflection.

Figure 2:
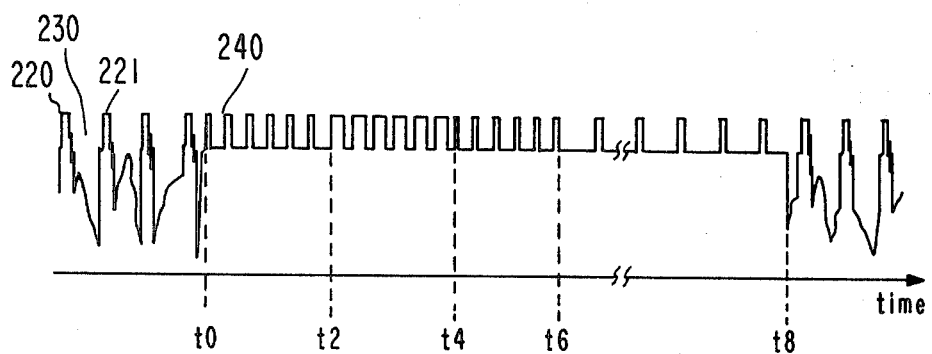
FIGS. 2 and 3 illustrate as amplitude-time diagrams certain voltage and current waveforms illustrating the operation of the arrangement of FIG. 1.

An amplitude-time plot of the composite video on conductor i near the vertical blanking interval is illustrated in FIG. 2. The vertical blanking interval extends from time T0 at which the vertical blanking interval begins to time T8, and has a duration approximately equal to that of 19 horizontal lines. The vertical scanning interval before time T0 and extending from time T8 to the next following time T0 contains video information and horizontal synchronizing signals. The horizontal synchronizing signals such as pulses 220, 221 are separated by interstices such as 230 which contain the video information at a lower amplitude than the synchronizing pulses.

The vertical synchronizing information in the composite video illustrated in FIG. 2 occurs in the interval between times T2 and T4 of the vertical blanking interval. During interval T2–T4, six wide pulses separated by five serrations allow the RC integrator portion (not shown) on the synchronizing signal separator to charge to a threshold. Because of the half-horizontal line difference in the starting time of each successive vertical field, the horizontal synchronizing pulses such as 220, 221 if carried through the interval T0–T2 would cause the RC integrator to assume slightly different charges in successive fields at time T2 at which the synchronizing interval begins. This might cause recurrent changes in the triggering of the synchronizing signal separator threshold device and might result in erratic interlace. In order to avoid this problem, the composite video in time T0–T2 includes equalizing pulses such as 240, which recur at twice the horizontal rate. Thus, there is no difference in the interval T0–T2 preceding the vertical synchronizing interval between an even field and an odd field, and the charge on the RC integrator at time T2 tends to remain constant. Because successive fields have a one-half line difference in vertical sync phasing, interlace also requires that the serrations occur at twice the H frequency to maintain the phasing of the integrator output constant relative to the start of the vertical sync pulses.

Figure 3:
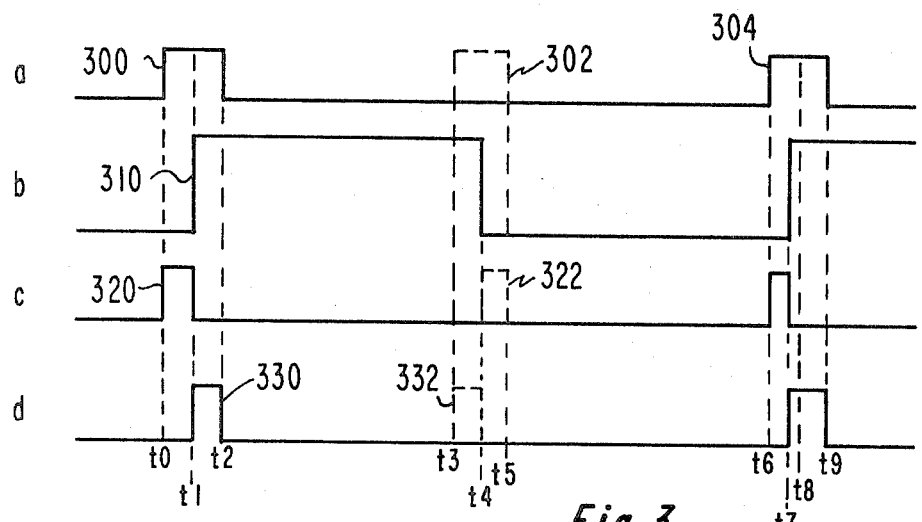

In operation during the vertical scanning interval, sync signal separator 16 produces on conductor A synchronizing signal pulses illustrated by the solid-line waveform in FIG. 3a. Pulse 300 has a duration from time T0 to time T2 of FIG. 3, which substantially coincides with the time of a horizontal pulse such as pulse 220 illustrated in FIG. 2. The PLL responds to the pulses, and oscillator 50 produces at its output a square wave illustrated as 310 in FIG. 3b, which square wave has a transition centered at a time T1 between times T0 and T2. AND gates 32 and 34 are enabled to respond to the signals at their second inputs when a sync pulse such as 300 is produced on conductor A. Thus, gates 32 and 34 are enabled for conduction in the interval T0–T2 of FIG. 3. In the interval T0–T1 when square wave 310 is low, inverter 36 applies a high signal to the second input of gate 32, producing at the output of gate 32 a current source gating pulse illustrated as 320 in FIG. 3c. Current source 42 responds with a current pulse which charges capacitor 40, which current pulse may also be illustrated by pulse 320.

In the interval T1–T2, both sync pulse 300 and square wave 310 are high, which enables gates 34 to produce a gating pulse illustrated as 330 in FIG. 3d. With square wave 310 high, inverter 36 drives an input of gate 32 low and gating pulse 320 produced by AND gate 32 ends. Thus, in the interval T1–T2 charging current source 42 does not conduct and discharging current source 44 conducts. So long as time T1 at which the transition of square wave 310 occurs remains centered in the interval T0–T2, gating pulses 320 and 330 will have equal duration, and gates 32 and 34 conduct alternately. If current sources 42 and 44 have equal magnitude, zero net change in charge on capacitor 40 results.

If, as illustrated in the interval T6–T9, the phase of oscillator square wave output signal 310 deviates, the transition of the square wave occurs at a time T7 which is not centered in the interval T6–T9. This results in charging current pulse 320 and discharging current pulse 330 having unequal durations, and will cause a net change in the capacitor voltage, whereby the frequency and phase of horizontal oscillator 50 are slewed in a feedback manner to maintain the transition centered on the synchronizing pulse.

During the vertical synchronizing and equalizing pulse intervals T0–T6 as illustrated in FIG. 2, the equalizing pulses and the serrations at twice the horizontal rate cause a double-rate response of synchronizing signal separator 16. Thus, in addition to pulses 300, 304 as illustrated in FIG. 3a, additional interstitial pulses such as 302 are produced on conductor A. The effect of an additional pulse 302 in the interval T3–T5 is to enable gates 32 and 34 for conduction. Square wave 310 may have a transition in this interval, as illustrated by FIG. 3b. In the interval T3–T4, pulse 302 and square wave 310 enable discharging current source 44 to produce a further discharing current illustrated as 332, and in the interval T4–T5 produce a gating pulse such as 322 which enables charging current source 42. A change in phase of the oscillator waveform illustrated in FIG. 3b would produce a change in duration of pulse 322 equal in size and opposite in polarity to the change in duration of pulse 320. This is also true of pulse 332 relative to pulse 330. The result of this additional response during the vertical synchronizing and equalizing pulse intervals is to render the phase detector relatively unresponsive to changes in phase.

As mentioned, lack of response to phase changes corresponds to a low-gain condition of the phase detector, which is particularly disadvantageous when the PLL must operate upon the video signals produced by a tape recorder wherein the oscillator must slew at a high rate at some time near the vertical blanking interval. Moreover, the low PLL gain may allow the oscillator to slew away from the correct phase even when there is no step change in the phase of the input signal. This can happen, for example, if current sources 42 and 44 are not perfectly matched in amplitude. There will be a net unbalance in current which will change the charge on capacitor 40 and result in oscillator slewing, which will require time to recover to the correct phase after the end of the equalizing pulse interval.

Figure 4:
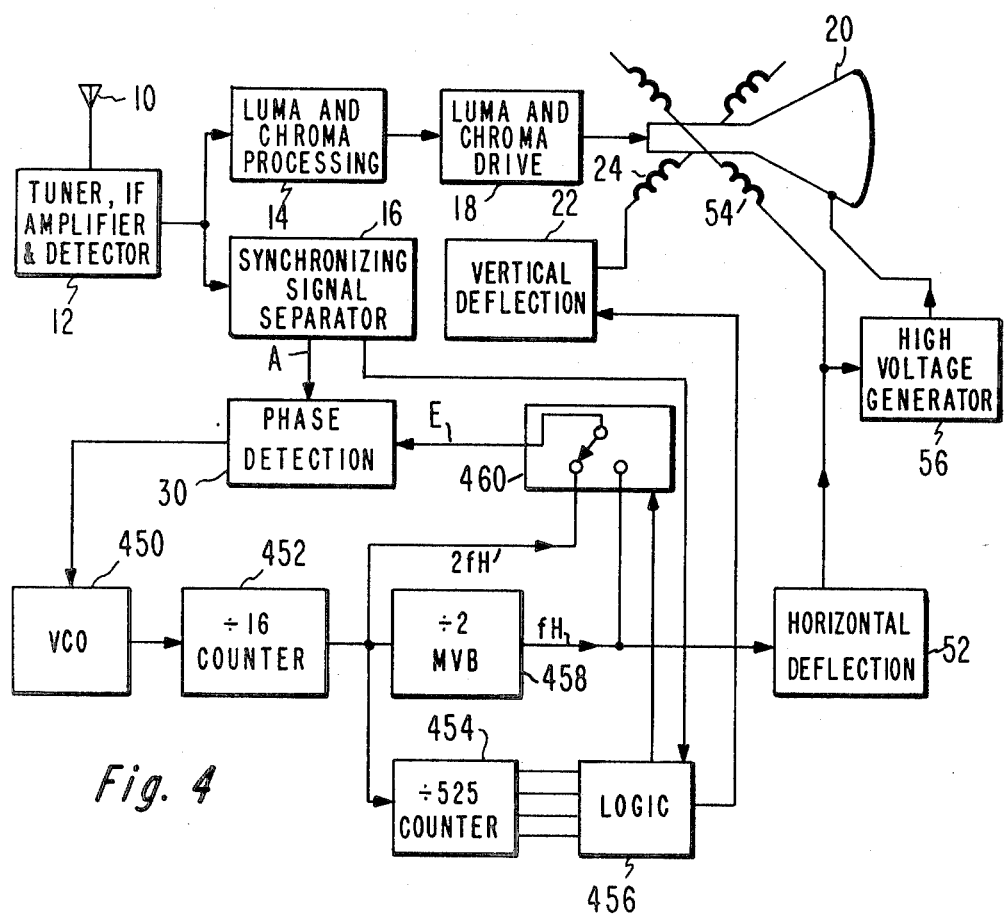
FIG. 4 is a block diagram of a television receiver embodying the invention.

FIG. 4 illustrates in block diagram form a television receiver embodying the invention. Those elements of FIG. 4 corresponding to elements of FIG. 1 are designated by the same reference numbers. In FIG. 4, a horizontal oscillator 450 is controlled by a direct control voltage from phase detector 30. Oscillator 450 operates at a high frequency such as 503 kHz. A divide-by-16 counter 452 receives the oscillator output and reduces it to approximately 32 kHz, which is twice the horizontal deflection frequency (2 fH). The 2 fH output of counter 452 is applied to a divide-by-525 counter 454 of a vertical count-down arrangement. The vertical count-down arrangement includes a logic circuit 456 which responds to the various states of counter 454 and to vertical synchronizing pulses from separator 16 to produce a vertical drive signal for vertical deflection circuit 22. Such a vertical count-down arrangement compensates for the excessive sensitivity of the sync separator to noise by excluding all separated sync signals but those positively identified as vertical sync signals, and supplies counter-produced vertical drive pulses to deflection circuit 22 continuously, regardless of the presence or absence of identifiable sync from separator 16. Such an arrangement is described in U.S. Pat. 3,688,037 issued Aug. 29, 1972 to Ipri and U.S. Pat. 3,878,335 issued Apr. 15, 1975 to Balaban. Additional counter outputs at preselected times may be obtained in known manner by means of logic circuit 456.

The 2 fH output of counter 452 is also applied to a divide-by-2 multivibrator 458, which produces signals at the horizontal deflection frequency (fH) for application to horizontal deflection circuit 52. The fH output of multivibrator 456 is also applied to an input of a controlled switch circuit 460. The 2 fH output of counter 452 is applied to another input of controlled switch circuit 460.

Switch circuit 460 selectively applies fH or 2 fH square waves to phase detector 30 under control of a vertical-frequency signal illustrated as 630 in FIG. 6d produced by logic circuit 456.

Figure 5:
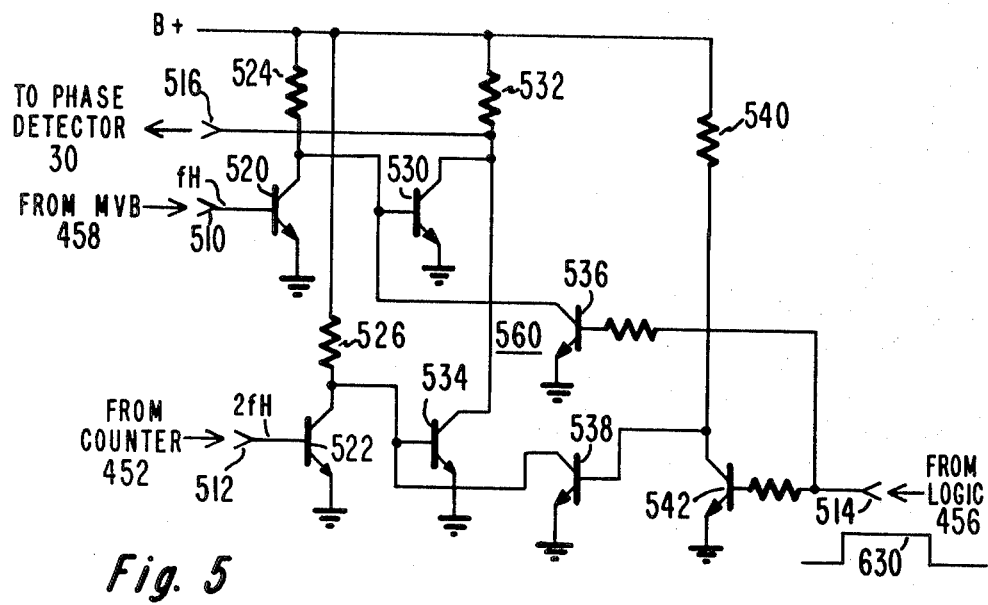
FIG. 5 is a schematic diagram of a portion of the arrangement of FIG. 4.

FIG. 5 illustrates in schematic form a circuit suitable for use as controllable switch 460 of FIG. 4. In FIG. 5, a controllable switch designated generally as 560 includes first and second input terminals or jacks 510 and 512 to which signals at fH and 2 fH are applied from multivibrator 458 and counter 452, respectively. Controllable switch 560 includes a further input terminal 514 coupled to logic circuit 456 for receiving a vertical-frequency switching control signal illustrated as signal 630. The positive-going portion of signals 630 has a duration encompassing at least the synchronizing and equalizing pulse portions of the vertical blanking signal. Controllable switch 560 produces at an output jack 516 signals at fH during those intervals in which control signal 630 is negative-going or low and signals at 2 fH during those intervals in which control signal 630 is positive or high.

Controllable switch 560 includes an NPN transistor 520 having its base coupled to jack 510 and its emitter coupled to ground. A transistor 522 has its base coupled to jack 512 and its emitter coupled to ground. The collector of transistor 520 is coupled to a source B+ of operating potential by means of a resistor 524, and the collector of transistor 522 is coupled to B+ by means of a resistor 526. The base of an NPN transistor 530 is connected to the collector of transistor 520, and its emitter is connected to ground. The collector of transistor 530 is connected to one end of a summing load resistor 532, the other end of which is connected to B+. An NPN transistor 534 has its base connected to the collector of transistor 522 and its emitter connected to ground. The collector of transistor 534 is connected to the collector of transistor 530 and to output jack 516. The base of transistor 530 is connected to collector of an NPN transistor 536, the emitter of which is coupled to ground and the base of which is connected to input jack 514. The base of transistor 534 is connected to the collector of an NPN transistor 538, the emitter of which is connected to ground and the base of which receives biasing current from B+ through a resistor 540. An inverting NPN transistor 542 has its collector connected to the base of transistor 538, its emitter connected to ground and its base connected to jack 514.

In operation during the vertical scanning interval, oscillator signals at fH and 2 fH are applied to jacks 510 and 512, respectively, and the input signal to jack 514 is low. With jack 514 low, transistors 536 and 542 are deprived of base-emitter bias and are nonconductive. Consequently, transistor 538 is conductive and holds the base of transistor 534 near ground, regardless of the 2 H drive from transistor 522. Thus, transistor 534 cannot respond to 2 fH signals. With transistor 536 nonconductive, the base of transistor 530 is switched by the fH signal, which appears noninverted at output jack 516 for application to phase detector 30. During the equalizing and vertical synchronizing pulse portions of the vertical blanking signal, control signal 630 applied to input jack 514 is high. With signal 630 high, transistors 536 and 542 become conductive. Transistor 542 deprives transistor 538 of base drive, and it becomes nonconductive and allows transistor 534 to be driven at 2 fH by transistor 522 to produce a noninverted 2 fH output at jack 516. At this same time, conductive transistor 536 maintains the base of transistor 530 low regardless of the fH drive from transistor 520, and prevents appearance of fH signals at output jack 516.

Figure 6:
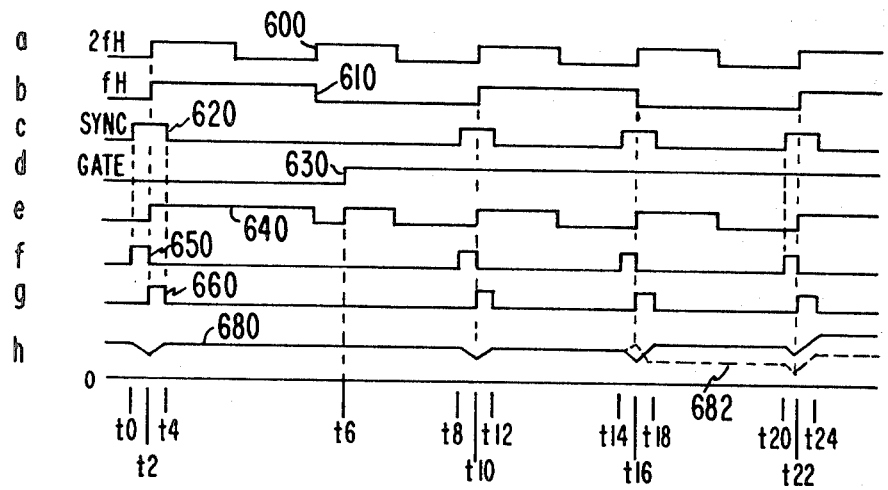
FIG. 6 illustrates as amplitude-time plots certain voltage and current waveforms occurring in the arrangement of FIG. 4 during operation.

In operation of the arrangement of FIG. 4, separator 16 produces on conductor A synchronizing signals illustrated as 620 in FIG. 6c. As illustrated in FIG. 6, synchronizing signals 620 recur at horizontal frequency fH in the interval T0–T6 and at 2 fH in the interval T6–T24. Thus, the time T0–T24 for which waveforms are illustrated in FIG. 6 represents a time interval encompassing the end of the vertical scanning interval and the beginning of the vertical blanking interval.

Before time T0, switch 460, in response to gating signal 630, allows the fH output of multivibrator 458 to be applied over a conductor E to the input of phase detector 30. The signal on conductor E is represented by signal 640 of FIG. 6e. During several horizontal lines preceding time T0, phase detector 30 compared synchronizing signals 620 with signal 640 to produce discharging and charging gated current pulses illustrated as signals 650 and 660, respectively, in FIGS. 6f and 6g. The filtered output of phase detector 30, illustrated as 680 in FIG. 6h, was applied to horizontal oscillator 450 to force signal 610 into consonance with sync signal 620, in a manner similar to that described in conjunction with FIG. 1.

Phase detector 30 is enabled in the interval T0–T4 by sync pulse 620, and responds with a discharging current pulse 650 in the interval in which signal 640 is low and with a charging current pulse 660 when signal 640 is high. This results in a discharge of the control signal capacitor in the interval T0–T2 and a charge in the interval T2–T4, which in turn results in a perturbation illustrated in exaggerated form in FIG. 6h. Because the durations of pulses 650 and 660 are equal, control voltage 680 assumes the same value after the sync pulse as it had before, and the PLL does not slew the oscillator.

At a time illustratively at T6 but which may range widely, counter 454 reaches a predetermined count and logic circuit 456 responds with a positive-going portion of gating signal 630. With gating signal 630 positive, switch 460 couples to conductor E the 2 fH signals 600 from counter 452 rather than the fH signals 610 from multivibrator 458. Thus, from time T6, until after the end (not shown) of the positive going portion of pulse 630, signal 640 applied over conductor E to phase detector 30 for comparison with sync signals 620 is at twice the horizontal frequency.

In the interval after time T6, phase comparisons occur twice as often, and the gain of the PLL is thus increased, and the oscillator can if required be slewed more rapidly. For example, in the interval T8–T12 the transition of the oscillator signal 600 and the corresponding signal 640 applied to phase detector 30 are centered on sync signal 620, whereby current drive signals 650 and 660 have equal durations and oscillator control signal 680 remains unchanged. Assuming that the oscillator phase changes after time T12 because of temperature or voltage changes, time T16 at which the transition occurs in signal 600 and corresponding signal 640 is not centered on interval T14–T18 in which a sync pulse 620 occurs. Consequently, discharging current pulse 650 decreases in duration and charging current pulse 660 increases in duration, resulting in a net increase in control voltage 680. Similarly, during the next synchronizing pulse interval T20–T24, the control voltage is again increased to increase the correction signal. If the phase comparison in phase detector 30 had been between sync signals 620 and signal 610 as in the prior art rather than between sync signal 620 and signal 600 in accordance with the invention, the oscillator control signal illustrated in FIG. 6h would have responded as illustrated by dashed portion 682, producing no net correction in response to the phase error.

It is not necessary to switch the signal applied to the phase detector from 2 fH to fH as illustrated in FIG. 4. If 2 fH signals are continuously applied to phase detector 30, the gain of the PLL will automatically increase during the equalizing and vertical synchronizing pulse intervals. Such an arrangement, without more, permits a 180° phase ambiguity, which might occur any time the signal source is momentarily interrupted, as when changing stations. The ambiguity may be resolved, as here, by a switching arrangement which applies fH signals to the phase detector for an interval sufficient to force the PLL to lock.

Other embodiments of the invention will be apparent to those skilled in the art. In particular, it will be apparent that the phase ambiguity when 2 fH is applied to the phase detector continuously may be resolved in other ways than by applying fH signals to the phase detector for a portion of the vertical scanning interval. For example, a gating circuit may be used to compare the fH output of the VCO with horizontal sync signals from the separator, and a 180° phase shifter may be coupled between the output of the divide-by-two flip-flop producing the fH signal and the horizontal deflection circuit. The phase shifter is toggled when the fH drive to the horizontal deflection circuit is improperly phased relative to the separator output.

What is claimed is:

1. An improved television oscillator phase control arrangement, comprising:
    a source of television synchronizing signals, said synchronizing signals including first portions at the horizontal scanning frequency during recurrent first intervals and second portions at a higher frequency during recurrent second intervals;
    controlled oscillator means including a first output terminal at which first oscillator signals are generated at a first frequency, and also including an oscillator rate control input terminal;
    phase detection means including a first input terminal and also a second input terminal which is coupled to receive said synchronizing signals, and an output terminal coupled to said control input terminal of said controlled oscillator means;
    coupling means for coupling said first input terminal of said phase detection means to said controlled oscillator means for forming an oscillator frequency and phase control loop for controlling said oscillator frequency and phase in response to said synchronizing signals;
    wherein the improvement lies in that said controlled oscillator means further comprises a second output terminal for providing second oscillator signals at a second frequency related to and greater than said first frequency; and
    said coupling means comprises controlled switch means coupled to said first input terminal of said phase detection means and to said first and second output terminals of said controlled oscillator means for applying said first oscillator signals to said first input terminal of said phase detection means substantially during said first intervals and for applying said second oscillator signals to said first input terminal of said phase detection means substantially during said second intervals.

2. An arrangement according to claim 1 wherein said first and second intervals recur alternately at the vertical deflection rate, and said second intervals include the equalizing and vertical synchronizing intervals.

3. An arrangement according to claim 1 wherein said controlled switch means comprises:
    first and second cascaded inverters, including a first juncture therebetween, the input of said first inverter being coupled to said first output terminal of said controlled oscillator means for receiving said oscillator signals at said first frequency, the output of said second inverter being coupled to a summing output terminal;
    third and fourth cascaded inverters including a second juncture therebetween, the input of said third inverter being coupled to said second output terminal of said controlled oscillator means for receiving said oscillator signals at said second frequency; and
    gating means coupled to said first and second junctures for alternately enabling said second and fourth inverters for alternately passing said first and second oscillator signals, respectively, to said first input terminal of said phase detection means.

4. An improved television oscillator phase control arrangement, comprising:
    a source of television synchronizing signals, said synchronizing signals including first portions at the horizontal scanning frequency during recurrent first intervals and second portions at a higher frequency during recurrent second intervals;

controlled oscillator means including a first output terminal at which first oscillator signals are generated at a first frequency, and also including an oscillator rate control input terminal;

phase detection means including a first input terminal and also a second input terminal which is coupled to receive said synchronizing signals, and an output terminal coupled to said control input terminal of said controlled oscillator means;

coupling means for coupling said first input terminal of said phase detection means to said controlled oscillator means for forming an oscillator frequency and phase control loop for controlling said oscillator frequency and phase in response to said synchronizing signals;

wherein the improvement lies in that said controlled oscillator means further comprises a second output terminal for providing second oscillator signals at a second frequency related to and greater than said first frequency, said coupling means being coupled between said phase detection means and said controlled oscillator means for selectively applying said first and second oscillator signals to said first input terminal of said phase detection means for frequency and phase control thereof, said frequency and phase control being subject to a phase ambiguity; and said coupling means further comprises phase control means for resolving said ambiguity.

5. An arrangement according to claim 4 wherein said phase control means comprises controlled switch means coupled to said first input terminal of said phase detection means and to said first and second output terminals of said controlled oscillator means for applying said first oscillator signals to said first input terminal of said phase detection means during said first intervals and for applying said second oscillator signals to said first input terminal of said phase detection means during said second intervals.

6. A television oscillator phase control arrangement comprising:

phase comparison means including first and second input terminals and also including an output terminal;

controllable oscillator means including a rate control input terminal coupled to said output terminal of said phase comparison means for producing rate-controlled first signal pulses;

a source of television synchronizing pulses, said synchronizing pulses recurring at a first rate during recurrent first intervals and recurring at a second rate greater than said first rate during recurrent second intervals;

coupling means coupled to said first and second input terminals of said phase comparison means, to said oscillator means and to said source for applying said first signal pulses and said synchronizing pulses to said phase comparison means for forming a phase-lock loop for causing said oscillator to produce said first signal pulses at a rate established by said synchronizing pulses;

wherein said coupling means further comprises controlling means for controlling the rate of said pulses applied to said phase comparison means for causing the rates of said first signal and said synchronizing pulses applied to said phase comparison means to be substantially equal.

7. An arrangement according to claim 6 wherein said oscillator means produces second signal pulses at a rate greater than the rate of said first signal pulses; and said controlling means applies said second signal pulses to said phase comparison means during said second intervals and applies said first signal pulses to said phase comparison means during said first intervals.

8. A television phase-lock loop apparatus comprising:

a controllable oscillator including an output terminal at which oscillator signals exhibiting successive transitions of first and second polarities are generated, and a control input terminal;

a phase detector including a first input terminal, a second input terminal, and an output terminal coupled to the control input terminal of said controllable oscillator;

a source of horizontal synchronizing signals having an output terminal, said synchronizing signals including horizontal-rate pulses, and intermediate pulses occurring in the interval between predetermined ones of said horizontal rate pulses; and means having a first input coupled to said output terminal of said controllable oscillator, a second input coupled to the output terminal of said source of horizontal synchronizing signals, a first output coupled to the first input terminal of said phase detector, and a second output coupled to the second input terminal of said phase detector for forming a phase-lock loop apparatus responsive to said synchronizing signals for locking the frequency and controlling the phase of said oscillator, said forming means including means for selectively controlling the application of said oscillator and synchronizing signals to said phase detector input terminals such that said synchronizing signals are applied to said phase detector in substantial time coincidence with only said first polarity transitions of said oscillator signals.

* * * * *